US011064538B2

(12) United States Patent
Chen et al.

(10) Patent No.: US 11,064,538 B2
(45) Date of Patent: Jul. 13, 2021

(54) METHODS AND APPARATUSES FOR PERFORMING RANDOM ACCESS PROCEDURES

(71) Applicant: FG Innovation Company Limited, Tuen Mun (HK)

(72) Inventors: Hung-Chen Chen, Hsinchu (TW); Chie-Ming Chou, Hsinchu (TW); Mei-Ju Shih, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 41 days.

(21) Appl. No.: 16/751,784

(22) Filed: Jan. 24, 2020

(65) Prior Publication Data

US 2020/0245369 A1 Jul. 30, 2020

Related U.S. Application Data

(60) Provisional application No. 62/796,854, filed on Jan. 25, 2019.

(51) Int. Cl.
*H04W 74/08* (2009.01)
*H04W 48/08* (2009.01)
*H04W 36/00* (2009.01)

(52) U.S. Cl.
CPC ... *H04W 74/0833* (2013.01); *H04W 36/0005* (2013.01); *H04W 48/08* (2013.01)

(58) Field of Classification Search
CPC combination set(s) only.
See application file for complete search history.

(56) References Cited

U.S. PATENT DOCUMENTS

| | | | |
|---|---|---|---|
| 2020/0288507 A1* | 9/2020 | Chang | H04W 72/1273 |
| 2020/0344030 A1* | 10/2020 | Cheng | H04W 76/27 |
| 2020/0351946 A1* | 11/2020 | Pang | H04W 72/042 |
| 2021/0084650 A1* | 3/2021 | Fan | H04L 5/0055 |

* cited by examiner

*Primary Examiner* — Hashim S Bhatti
(74) *Attorney, Agent, or Firm* — ScienBiziP, P.C.

(57) ABSTRACT

A method performed by an apparatus of wireless communications is provided. The method includes receiving a plurality of Random Access (RA) configurations associated with a set of Bandwidth Parts (BWPs), selecting a first BWP from the set of BWPs to perform an RA procedure, and selecting a first Synchronization Signal Block (SSB) associated with the first BWP. The first SSB may be configured with a first RA resource. The method further includes transmitting a first RA preamble using the first RA resource and setting the first BWP as a first-activated BWP when the RA procedure is successfully performed.

18 Claims, 10 Drawing Sheets

US 11,064,538 B2

METHODS AND APPARATUSES FOR PERFORMING RANDOM ACCESS PROCEDURES

CROSS-REFERENCE TO RELATED APPLICATION(S)

The present application claims the benefit of and priority to a provisional U.S. Patent Application Ser. No. 62/796,854, filed on Jan. 25, 2019, entitled "Enhanced HO Procedure to Unlicensed Target Cell," with hereinafter referred to as US76443 application. The disclosure of the US76443 application is hereby incorporated fully by reference into the present application.

FIELD

The present disclosure generally relates to wireless communications, and more particularly, to methods and apparatuses for performing Random Access (RA) procedures.

BACKGROUND

Various efforts have been made to improve different aspects of wireless communications (e.g., data rate, latency, reliability and mobility) for the next generation (e.g., fifth generation (5G) New Radio (NR)) wireless communication systems. Among the new concepts in the next generation wireless communication systems, NR-Unlicensed (NR-U) technology may achieve higher system capability and promote higher spectrum utilization by supporting operations on the unlicensed spectrum.

However, the success rate of an RA procedure may be affected in wireless communication systems where devices may attempt to access cells on the unlicensed spectrum, resulting in an increased failure rate of initial access and/or handover procedures.

SUMMARY

The present disclosure is directed to methods and apparatuses for methods and apparatuses for performing RA procedures.

According to an aspect of the present disclosure, an apparatus for wireless communications is provided. The apparatus includes a memory and at least one processor coupled to the memory. The at least one processor is configured to receive a plurality of Random Access (RA) configurations associated with a set Bandwidth Parts (BWPs), select a first BWP from the set of BWPs to perform an RA procedure and select a first Synchronization Signal Block (SSB) associated with the first BWP. The first SSB may be configured with a first RA resource. The at least one processor may be further configured to transmit a first RA preamble using the first RA resource, and set the first BWP as a first-activated BWP when the RA procedure is successfully performed.

According to another aspect of the present disclosure, a method performed by an apparatus of wireless communications is provided. The method includes receiving a plurality of RA configurations associated with a set of BWPs, selecting a first BWP from the set of BWPs to perform an RA procedure, and selecting a first SSB associated with the first BWP. The first SSB may be configured with a first RA resource. The method further includes transmitting a first RA preamble using the first RA resource and setting the first BWP as a first-activated BWP when the RA procedure is successfully performed.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
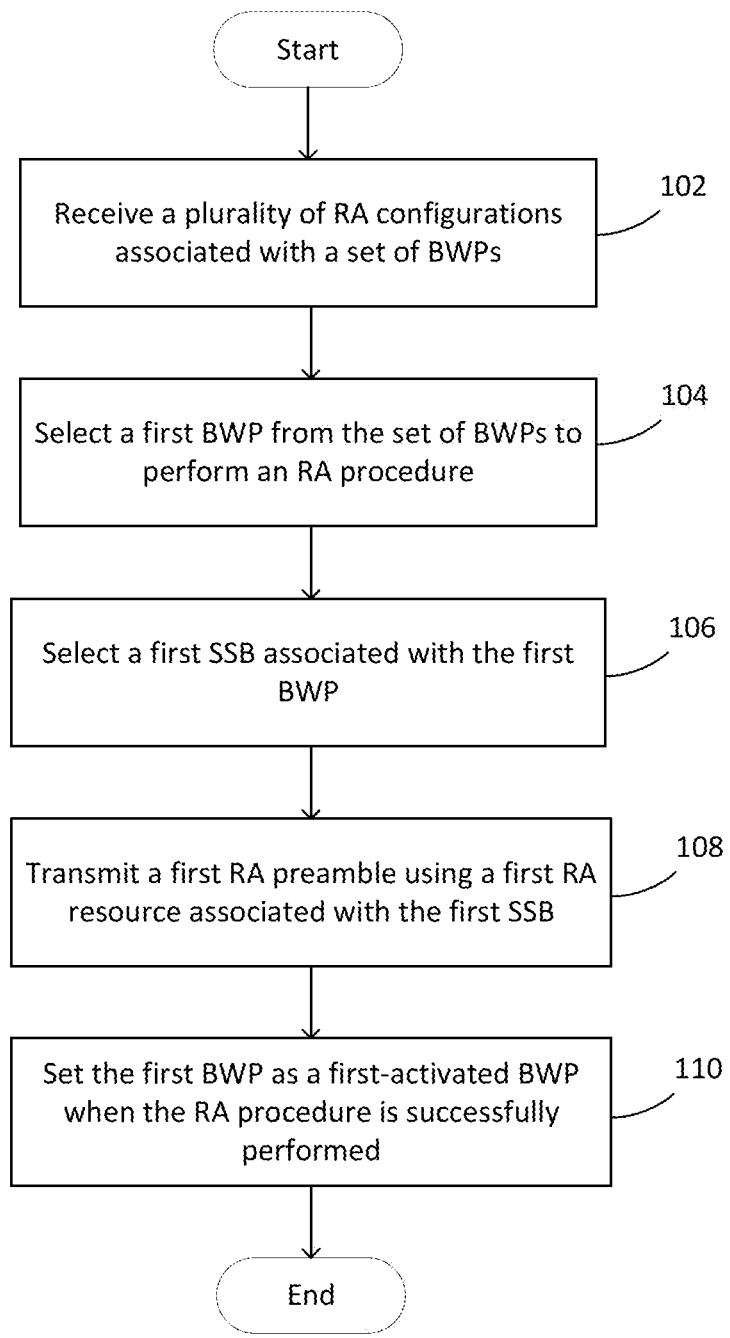
FIG. 1 is a flowchart for a method of performing an RA procedure, in accordance with an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G New Radio (NR) Radio Access Network (RAN)) typically includes at least one base station, at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects and represents that three relationships may exist. For example, A and/or B may indicate that: A exists alone, A and B exist at the same time, or B exists alone. In addition, the character "/" herein generally represents that the former and latter associated objects are in an "or" relationship.

FIG. 1 is a flowchart for a method of performing an RA procedure, in accordance with an example implementation of the present application.

In action 102, a User Equipment (UE) (or an apparatus of wireless communications) may receive a plurality of RA configurations associated with a set of BWPs.

In some implementations, each RA configuration may include resource allocation information of RA resource(s) and/or at least one signal quality threshold. For example, when performing an RA procedure on a BWP, a UE may identify the resource location and/or the type of an RA resource based on the resource allocation information. The type of the RA resources may include, for example, dedicated RA resources (e.g., Contention-Free RA (CFRA) resources) and common RA resources (e.g., Contention-Based RA (CBRA) resources). In addition, the UE may determine whether the signal quality of an SSB or a Channel State Information Reference Signal (CSI-RS) is qualified for an RA resource selection procedure based on the signal quality threshold.

In some implementations, the plurality of RA configurations configured to the UE may be Listen Before Talk (LBT)-related configurations. For example, each of the plurality of RA configurations may be configured based on a per LBT unit basis.

The LBT mechanism may be a technique that requires a wireless device (e.g., UE) to sense its radio environment (e.g., by performing Clear Channel Assessment (CCA) procedures) before it starts a transmission. An LBT procedure may provide access to the medium for a wireless device (e.g., UE) that senses that the medium is available. If the wireless device (e.g., UE) determines that the medium is available after performing the LBT procedure, it may be considered that the LBT procedure is passed. In LTE systems, the LBT mechanism may be used to ensure the coexistence of the Licensed Assisted Access (LAA) technology and the Wi-Fi technology, where the LAA technology may use Carrier Aggregation (CA) methods to combine LTE operations on the unlicensed spectrums (e.g., 5 GHz) and the licensed spectrums. In NR systems, an LBT procedure may be required before a transmission performed on an unlicensed spectrum. In some implementations, an NR-U operating bandwidth may be an integer multiple of 20 MHz, where an LBT procedure may be performed for the NR-U operating bandwidth per 20 MHz basis. In such cases, each 20-MHz bandwidth may be deemed as an LBT unit (or called "LBT channel"). Each LBT unit may be deemed as a basic unit for a lower layer entity (e.g., a Physical (PHY) entity) to perform an LBT procedure. If an LBT unit passes the LBT procedure (e.g., the UE considers that radio resource of the LBT unit is available to access), the UE may occupy the LBT unit for a period of time based on an LBT category and/or certain predefined regulations.

Due to the similarity between LBT and CCA mechanisms, it should be noted that the terms "LBT unit", "LBT subband", "CCA unit" and "CCA sub-band" may be interchangeable in some implementations. Additionally, the terms "LBT procedure" and "CCA procedure" may be interchangeable in some implementations. Furthermore, the term "RA configuration" and the term "Random Access Channel (RACH) configuration" may be interchangeable in some implementations, and the term "RACH resource" and the term "RA resource" may be interchangeable in some of the present implementations.

In action 104, the UE may select a first BWP from the set of BWPs to perform an RA procedure. The RA procedure may be a 4-step RACH procedure or a 2-step RACH procedure. In a 4-step RACH procedure, the messages may be identified as msg1 (e.g., an RA preamble), msg2 (e.g., an RA Response (an RAR)), msg3 (e.g., a Radio Resource Control (RRC) connection request) and msg4 (e.g., an RRC contention setup/resolution message). In a 2-step RACH procedure, the messages may be identified as msgA (e.g., an RA preamble and a payload) and msgB (e.g., an RAR).

In some implementations, the first BWP may be selected from the set of BWPs based on a channel occupancy condition and/or whether a CFRA resource is configured. For example, the first BWP may be selected when the first BWP has the lowest channel occupancy rate (or has a channel occupancy rate less than a predetermined/configured threshold value). For example, the first BWP may be selected when the first BWP is configured with a CFRA resource. In some implementations, the first BWP may be selected when the first BWP has a higher priority value than other BWPs. For example, the UE may receive the priority value via dedicated signaling and/or system information broadcast by the network.

In action 106, the UE may select a first SSB associated with the first BWP. For example, if the first BWP is associated with multiple SSBs, the UE may prioritize to select an SSB having a signal quality value above the signal quality threshold and being associated with a dedicated RA resource (e.g., a CFRA resource) as the outcome of the SSB selection. The signal quality value may be a Reference Signals Received Power (RSRP) value, a Received Signal Strength Indicator (RSSI) value, a Signal to Interference-plus-Noise Ratio (SINR) value, a Reference Signal Received Quality (RSRQ) value, or any other signal-quality-related measured metrics. Thus, in some implementations, the first SSB may have a an RSRP value greater than a signal quality threshold, and the first RA resource associated with the first SSB may be a dedicated RA resource. It should be noted that the first BWP may also be selected based on some other SSB selection rules or regulations. For example, details of the SSB selection may be described with reference to the RA procedures illustrated in FIGS. 4A, 4B, 5A and 5B.

In action 108, the UE may transmit a first RA preamble using a first RA resource associated with the first SSB. In some implementations, the first RA resource may be contained in a dedicated LBT unit in the first BWP, where the dedicated LBT unit may occupy a part of the resources of the first BWP, and the first RA preamble may be transmitted when an LBT procedure performed on the dedicated LBT unit is successful. An example of the LBT-unit-based RA transmission may be described with reference to FIG. 6.

In action 110, the UE may set the first BWP as a First Activated BWP (or called "First Active BWP") when the RA procedure is successfully performed. For example, during a handover procedure, when a target cell receives an RRC message (e.g., an RRC reconfiguration complete message) on a BWP, the target cell may consider that the BWP is the First Activated BWP for the UE. In some implementations, the target cell may transmit a configuration of the First Activated BWP to the UE via an RRC message.

Figure 2:
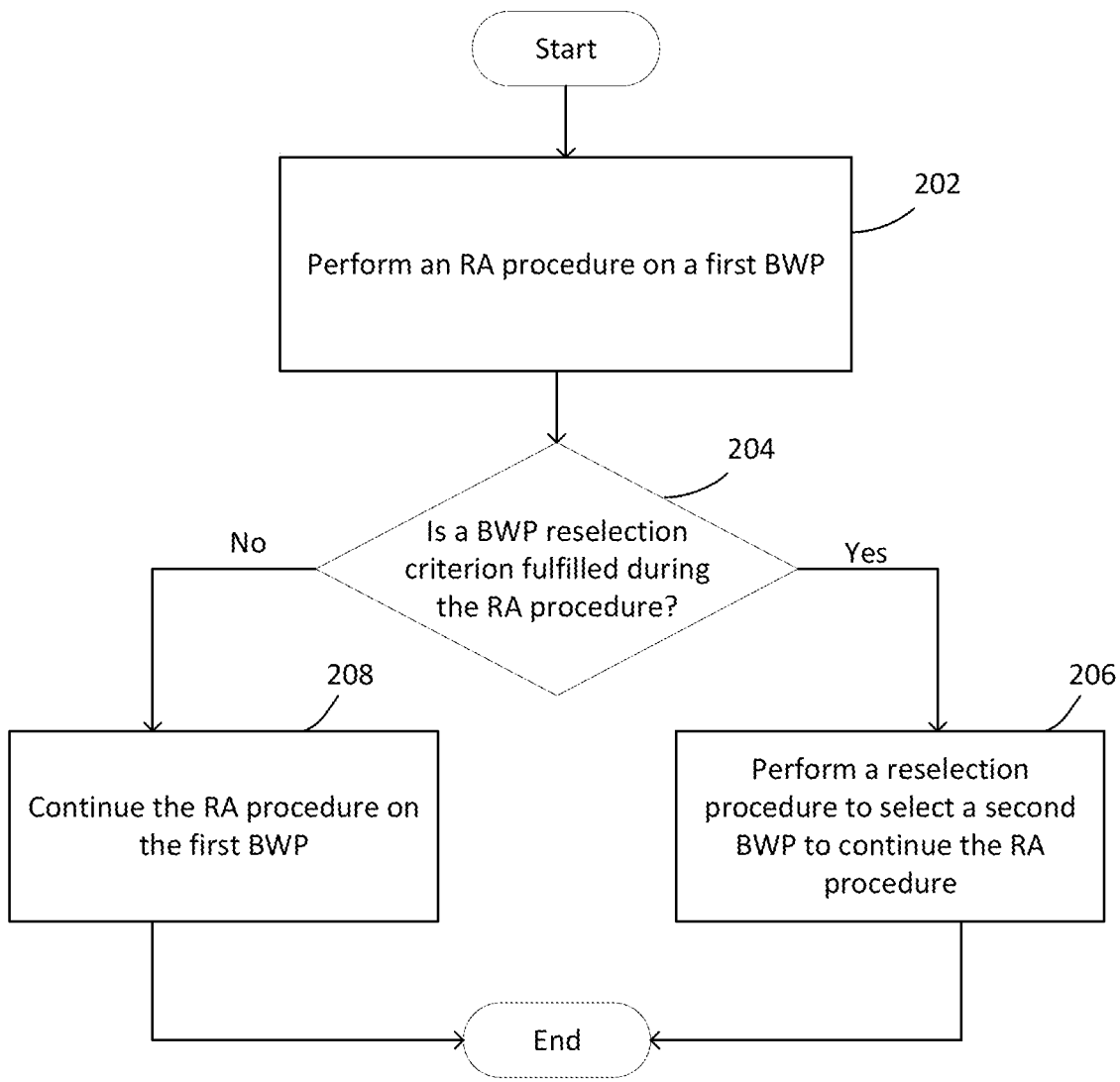
FIG. 2 is a flowchart for a method of performing an RA procedure, in accordance with an example implementation of the present application.

FIG. 2 is a flowchart for a method of performing an RA procedure, in accordance with an example implementation of the present application.

In action 202, a UE (or an apparatus of wireless communications) may perform an RA procedure on a first BWP (e.g., as determined in action 106 of FIG. 1).

In action 204, the UE may determine whether a BWP reselection criterion is fulfilled during the RA procedure. If the BWP reselection criterion is fulfilled when the UE is performing the RA procedure, the UE may perform a reselection procedure to select a second BWP to continue the RA procedure in action 206, where the second BWP may be the same as or different from the first BWP, depending on, for example, predefined or configured BWP selection rules. If the BWP reselection criterion is not fulfilled during the entire RA procedure, the UE may continue the RA procedure on the first BWP in action 208.

In some implementations, the BWP reselection criterion may be related to whether one or more steps in the RA procedure (e.g., msg1/msg2/msg3/msg4 in case of a 4-step RACH procedure, or msgA/msgB in case of a 2-step RACH procedure) has failed. For example, the BWP reselection criterion may be that the UE does not successfully transmit an RA preamble. In such cases, when the BWP reselection criterion is fulfilled, the UE may reselect to the second BWP and switch to the second BWP to continue the RA procedure (e.g., transmitting another RA preamble on the second BWP). In another example, the BWP reselection criterion may be that the UE does not receive the corresponding RAR within an RAR window after transmitting an RA preamble.

In some implementations, when the UE reselects the second BWP in action 206, the method may proceed back to action 204, where the UE may continue to determine whether the BWP reselection criterion is fulfilled during the RA procedure.

Figure 3:
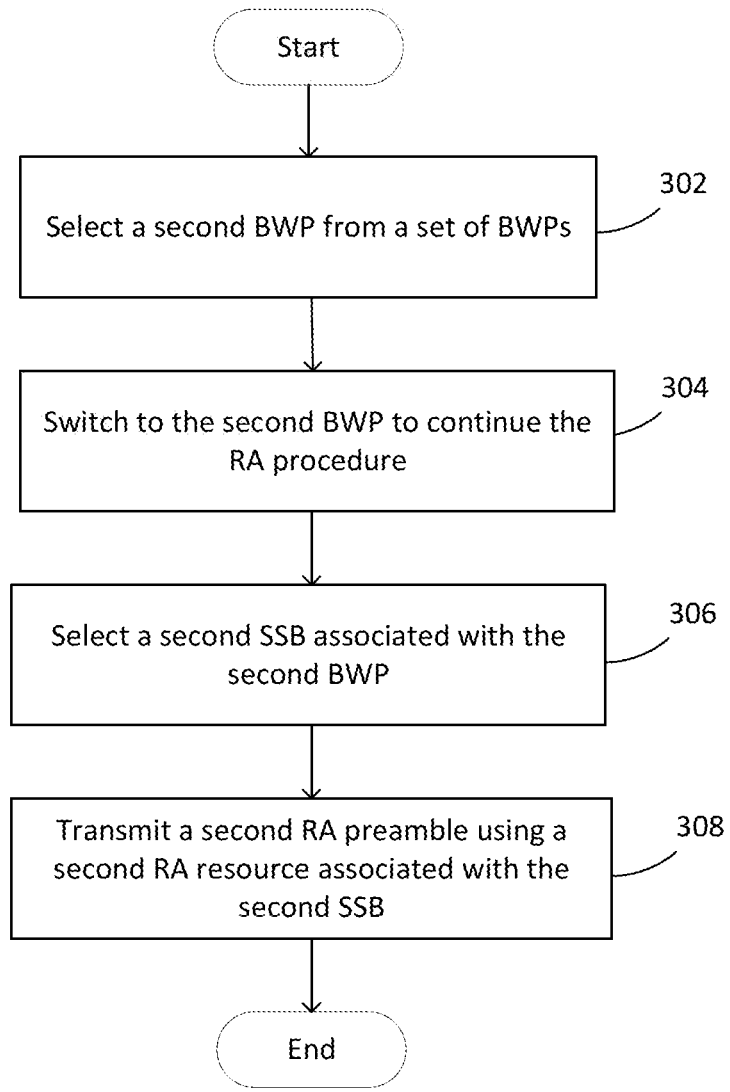
FIG. 3 is a flowchart for a reselection procedure of a BWP, in accordance with an example implementation of the present application.

FIG. 3 is a flowchart for a reselection procedure of a BWP, in accordance with an example implementation of the present application. For example, the reselection procedure may correspond to action 206 illustrated in FIG. 2.

In action 302, a UE (or an apparatus of wireless communications) may select a second BWP from a set of BWPs configured to the UE. It should be noted that the selection rules for the first BWP (e.g., as illustrated in action 104 of FIG. 1) may also be applicable to the selection of the second BWP. For example, the second BWP may be selected when the second BWP has the lowest channel occupancy rate, and/or is configured with a CFRA resource. In another example, the second BWP may be selected when the second BWP has a higher priority value than other BWPs (or those BWPs that have not been selected for the RA procedure).

In action 304, the UE may switch to the second BWP to continue the RA procedure. For example, depending on the current progress of the RA procedure, the UE may perform the remaining part of the RA procedure on the second BWP.

In some implementations, the UE may continue the RA procedure on the second BWP based on a group of RA parameters and a group of UE variables. The group of RA parameters may include at least one of an initial RA preamble power (e.g., preambleReceivedTargetPower), a power-ramping factor (e.g., powerRampingStep), and a maximum number of RA preamble transmission (e.g., preambleTransMax). The group of UE variables may include a preamble counter (e.g., PREAMBLE_TRANSMISSION_COUNTER), and/or a power ramping counter (e.g., PREAMBLE_POWER_RAMPING_COUNTER)). In some implementations, the UE may continue the RA procedure on the second BWP by applying the group of UE variables with un-reset values (e.g., applying the preamble counter and/or power ramping counter with un-reset values). In some other implementations, the UE may continue the RA procedure on the second BWP by applying the group of UE variables with reset values.

In action 306, the UE may select a second SSB associated with the second BWP.

The second SSB may be determined based on certain SSB selection rule and/or regulations. For example, the second SSB may be selected when the second BWP has the lowest channel occupancy rate among the set of BWPs configured to the UE. The channel occupancy rate may be defined by (but not limited to) the fraction of the time that a channel is occupied, where an occupied channel may be referred to, for example, a channel containing signal(s) in addition to noise. In another example, the second SSB may be selected when the second SSB has the strongest signal strength level compared to other SSBs (e.g., the SSBs associated with the same BWP (e.g., the second BWP) as the second SSB, or the SSBs associated with the BWP(s) configured to the UE). In another example, the second SSB may be selected when the second BWP associated the second SSB has a highest priority value among the set of BWPs. In some implementations, the reselection rules and/or regulations for the second SSB may also be applicable to the selection of the first SSB (e.g., as illustrated in action 106 of FIG. 1).

In action 308, the UE may transmit a second RA preamble using a second RA resource associated with the second SSB. For example, the MAC entity of the UE may set an RA preamble index (e.g., the PREAMBLE_INDEX Information Element (IE)) to a value (e.g., ra_PreambleIndex) that corresponds to the second SSB, so that the PHY entity of the UE may transmit a second RA preamble on the second BWP based on the RA preamble index.

Typically, an RA procedure may be initiated for a handover procedure, where the handover procedure may be triggered when a UE moves from a source cell to a target cell. However, if the target cell is on an unlicensed spectrum (e.g., an NR-U cell), the success rate of the handover procedure may be affected by the success rate of LBT (e.g., the rate of passing the LBT procedure).

In some implementations, to help the UE to access the target cell, the target cell may include one of the following RACH configurations in a handover message: (1) a common RACH configuration, (2) a common RACH configuration and a dedicated RACH configuration which are associated with one or more SSBs, and (3) a common RACH configuration and a dedicated RACH configuration which are associated with one or more CSI-RSs.

In some implementations, the dedicated RACH configuration may include at least one signal quality threshold and the resource allocation information of dedicated RACH resource(s). For example, when the UE is configured with the dedicated RACH resource (e.g., a contention-free RACH resource), the UE may prioritize to use the dedicated RACH resource over the common RACH resource (e.g., the contention-based RACH resource) if the signal quality value of the dedicated RACH resource is greater than a signal quality threshold. In some implementations, the order to access a dedicated RACH resource may depend on specific UE implementations.

In some implementations, a serving cell may be configured with one or more BWPs (e.g., four BWPs), and there may be only one active BWP for each serving cell. For each activated serving cell which is configured with an active BWP, the MAC entity of the UE may transmit one or more RA preambles on the active BWP (if the corresponding Physical Random Access Channel (PRACH) occasions are configured). In case of a handover, the UE may perform an RA procedure according to the RA parameters configured for the first active UL BWP. The RA parameters may be included in a reconfiguration parameter for synchronization (e.g., the reconfigurationWithSync IE).

In some implementations, for wideband operations on unlicensed spectrums (for DL and/or UL transmissions), a bandwidth greater than 20 MHz may be supported with multiple serving cells. In addition, a serving cell configured with a bandwidth larger than 20 MHz may be supported by NR-U operations. Thus, for a handover procedure, there may be several options for a BWP-based operation in a carrier with a bandwidth larger than 20 MHz. The options are shown as follows:

Option 1a: Multiple BWPs may be configured with common/dedicated RA resources, and the UE may transmit an RA preamble on one or more BWPs at a time.

Option 1b: Multiple BWPs may be configured with common/dedicated RA resources, and the UE may transmit an RA preamble on one BWP at a time.

Option 2: Multiple BWPs may be configured, and only one BWP that is configured with common/dedicated RA resources may be indicated for synchronization. In this option, the UE may only transmit an RA preamble if a LBT is successful for the entire indicated BWP.

Option 3: Multiple BWPs may be configured, and only one BWP that is configured with common/dedicated RA resources may be indicated for synchronization. In this option, the UE may only transmit an RA preamble on parts of or the entire indicated BWP if a LBT is successful for the associated part(s) of or the entire indicated BWP.

In some implementations, to increase the success rate of a handover procedure, common/dedicated RA resources may be configured on multiple BWPs of a target cell, or on multiple LBT units of a BWP. In this manner, the successful rate of RA preamble transmissions may be increased. For example, the target BS during the handover procedure may configure dedicated RA resources on multiple BWPs. The BWPs may be associated with SSBs and/or CSI-RSs of a target cell operated on an unlicensed spectrum.

In some implementations, a UE may receive reconfiguration parameters for synchronization in network signaling. The reconfiguration parameters may be configured for a target Primary Cell (PCell) or a Primary Secondary Cell Group (SCG) Cell (Primary SCG Cell, PSCell), and may be included in, for example, the ReconfigurationWithSync IE.

In some implementations, a PCell may be a Master Cell Group (MCG) cell operating on the primary frequency, in which a UE may perform an initial connection establishment procedure or initiate a connection re-establishment procedure. On the other hand, in case of Dual Connectivity (DC), a PSCell may be an SCG cell in which a UE may perform an RA procedure when performing a synchronous reconfiguration procedure. For a UE in an RRC CONNECTED state that is not configured with CA/DC, there may be only one serving cell comprising the primary cell. For a UE in an RRC CONNECTED state that is configured with CA/DC, serving cells may refer to a set of cells comprising special cell(s) and all secondary cells. For DC operations, a special cell may refer to a PCell of an MCG or a PSCell of an SCG, otherwise the special cell may refer to a PCell.

In some implementations, a dedicated RACH configuration (e.g., in the RACH-ConfigDedicated IE) may include several dedicated RA parameters, such as RACH occasions, CFRA resources (associated with an SSB or an CSI-RS), RA preamble indices, PRACH configuration indices, and so on. In some implementations, different BWPs may be configured with different CFRA resources. For example, a target base station may configure a first dedicated RA resource on a BWP #1 (which may be associated with an SSB having an SSB ID #1) of a target cell, and configure a second dedicated RA resource on a BWP #2 (which may be associated with a CSI-RS having a CSI-RS ID #2) of the target cell. In some implementations, the dedicated RA resource(s) of a BWP may be associated with an SSB and/or a CSI-RS.

In some implementations, the bandwidth of a BWP that is associated with a dedicated/common RA resource for synchronous reconfiguration (e.g., to handover to an NR-U PCell, and/or to add an NR-U PSCell) may be an integer multiple of 20 MHz, and an LBT procedure may be performed based on a per LBT unit basis (e.g., per 20 MHz basis).

In some implementations, multiple LBT units in a BWP may be configured with dedicated RA resources, where each dedicated RA resource may be a corresponding association type, depending on the dedicated RA resource being associated with an SSB or a CSI-RS. For example, in a case where a BWP includes an LBT unit #1 and an LBT unit #2, the LBT unit #1 may be configured by the network with a first dedicated RA resource associated with an SSB, and the LBT unit #2 may be configured by the network with a second dedicated RA resource associated with a CSI-RS.

In some implementations, when selecting an RA resource during the RA procedure, a UE may perform a BWP selection to select a BWP from the BWPs associated with the dedicated RA resources. In some implementations, the BWP selection may be performed in each round of an RA resource selection during an RA procedure. In such cases, each round of the RA resource selection may include a BWP selection and an SSB/CSI-RS selection. In the SSB/CSI-RS selection, one or more SSBs/CSI-RSs may be selected and the RA resource(s) corresponding to the selected SSB(s)/CSI-RS(s) may be determined.

Figure 4A:
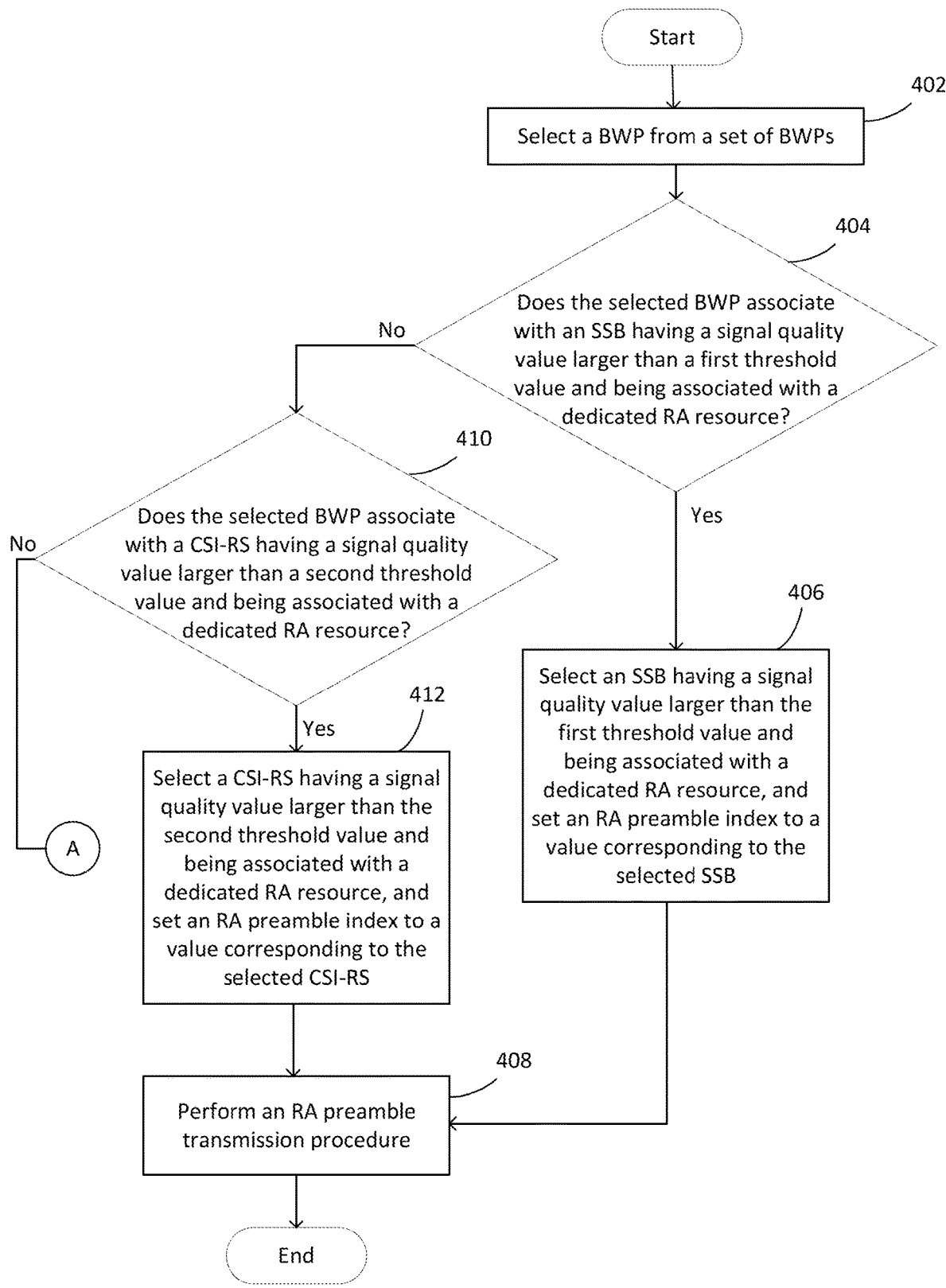
FIGS. 4A and 4B are flowcharts for a method of performing an RA procedure, in accordance with an example implementation of the present application.
Figure 4B:
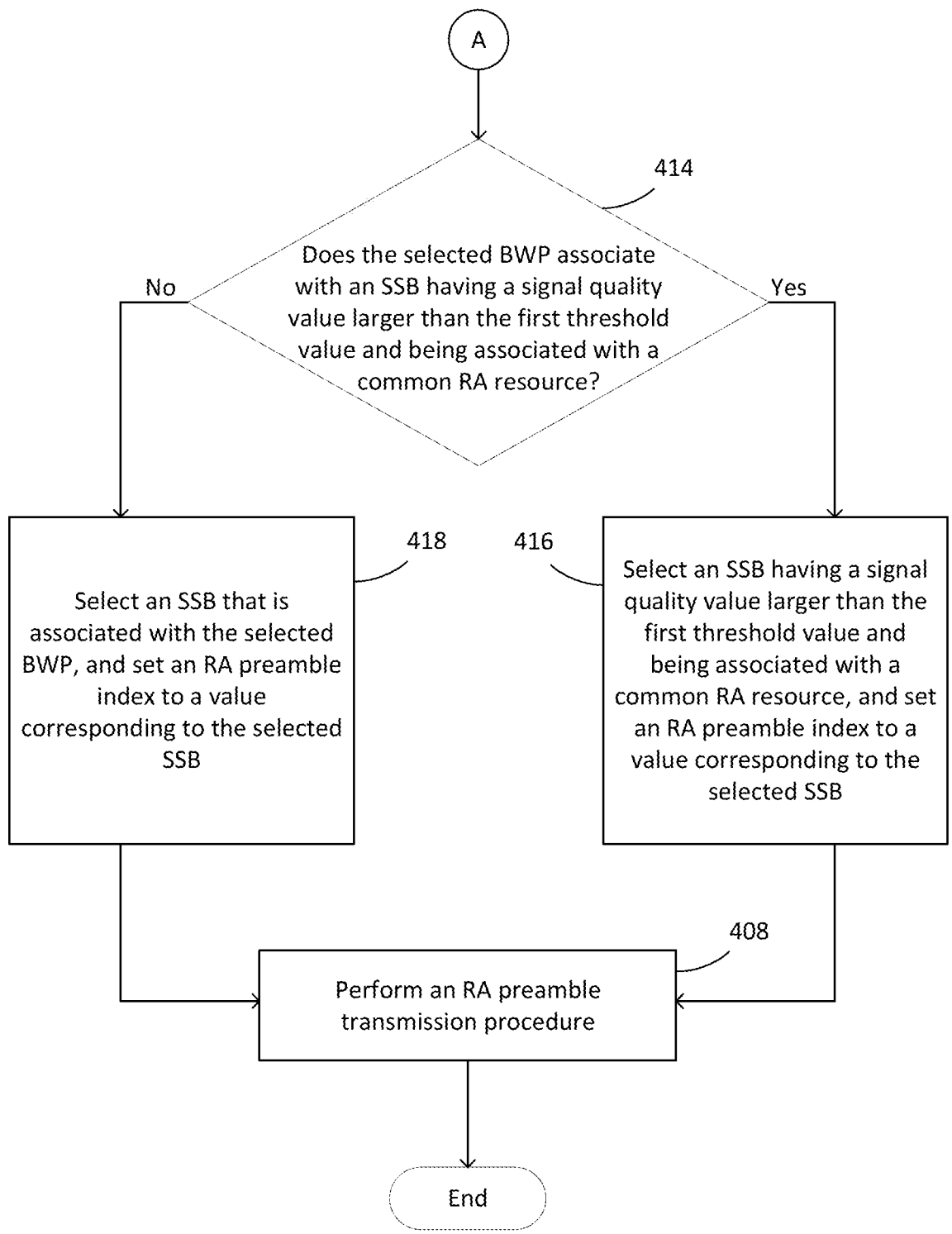

FIGS. 4A and 4B illustrate a flowchart for a method of performing an RA procedure, in accordance with an example implementation of the present application.

In action 402, a UE may select a BWP from a set of BWPs.

For example, if dedicated RA resources associated with multiple BWPs have been explicitly provided by the RRC entity of the UE, the MAC entity of the UE may select a BWP from the BWPs associated with the dedicated RA resources, and perform the RA procedure on the selected BWP.

In some implementations, the selected BWP may be configured with dedicated RA resources and/or common RA resources, where each RA resource may be associated with an SSB and/or a CSI-RS of the selected BWP.

In some implementations, the UE may select the BWP according to an indication from the network. For example, the network may indicate to the UE which BWP is used for the RA procedure via dedicated signaling and/or system information. In such cases, the selected BWP may be an indicted BWP by the network. In view of this, the term "selected BWP" and the term "indicated BWP" may be interchangeable in some of the present implementations.

In action 404, the UE may determine whether the selected BWP associates with an SSB having a signal quality value (e.g., a Synchronization Signal RSRP (SS-RSRP) value) larger than a first threshold value (e.g., provided in the rsrp-ThresholdSSB IE) and being associated with a dedicated RA resource. In some implementations, the rsrp-ThresholdSSB IE may be an RSRP threshold used in the comparison operations engaged in an SSB selection, as well as the corresponding RA preamble and/or PRACH occasion selections.

If the outcome of action 404 is Yes, in action 406, the UE may select an SSB having a signal quality value larger than the first threshold value and being associated with a dedicated RA resource, and set an RA preamble index (e.g., PREAMBLE_INDEX, which may be a UE variable for an RA procedure) to a value (e.g., ra-PreambleIndex) corresponding to the selected SSB.

For example, the dedicated RA resources associated with the SSBs of the selected BWP have been explicitly provided by the RRC entity of the UE, and among the associated SSBs of the selected BWP, there may be at least one available SSB having an SS-RSRP value greater than the rsrp-ThresholdSSB value. In such cases, the MAC entity of the UE may select an SSB from the at least one available SSB, and set an RA preamble index (e.g., the PREAMBLE_INDEX) to a value (e.g., ra-PreambleIndex) corresponding to the selected SSB. In some implementations, the selected SSB may have the strongest signal strength among the SSBs associated with the selected BWP.

In some other implementations, in action 406, the UE may select at most N1 SSBs (where N1 is a positive integer) having signal quality values larger than the first threshold value and being associated with the dedicated RA resources, and set the RA preamble index (e.g., the PREAMBLE_INDEX) for each selected SSB.

Then in action 408, the UE may perform an RA preamble transmission procedure to transmit one or more RA preambles on the selected BWP. For example, the UE may instruct its PHY layer to transmit an RA preamble through a PRACH occasion corresponding to the RA preamble index, the RA Radio Network Temporary Identifier (RA-RNTI) (if available), and the preamble received target power (e.g., PREAMBLE_RECEIVED_TARGET_POWER, which may be a UE variable for an RA procedure).

If the outcome of action 404 is No, the UE may determine whether the selected BWP associates with a CSI-RS having a signal quality value (e.g., a CSI-RSRP value) larger than a second threshold value (e.g., provided in the rsrp-ThresholdCSI-RS IE) and being associated with a dedicated RA resource in action 410. In some implementations, the rsrp-ThresholdCSI-RS IE may be an RSRP threshold used in the comparison operations during a CSI-RS selection, as well as the corresponding RA preamble and/or PRACH occasion selections.

If the outcome of action 410 is Yes, in action 412, the UE may select a CSI-RS having a signal quality value larger than the second threshold value and being associated with a dedicated RA resource, and set an RA preamble index (e.g., the PREAMBLE_INDEX) to a value (e.g., ra-PreambleIndex) corresponding to the selected CSI-RS. Then, the procedure may proceed to action 408, in which the UE may perform an RA preamble transmission procedure according to the RA preamble index.

For example, the dedicated RA resources associated with the CSI-RSs of the selected BWP may be explicitly provided by the RRC entity of the UE. Among the associated CSI-RSs of the selected BWP, there may be at least one available CSI-RSs having a CSI-RSRP value greater than the rsrp-ThresholdCSI-RS value (i.e., the value of the rsrp-ThresholdCSI-RS IE). In such cases, the MAC entity of the UE may select a CSI-RS from the at least one available CSI-RS, and set an RA preamble index (e.g., the PREAMBLE_INDEX) to a value (e.g., ra-PreambleIndex) corresponding to the selected CSI-RS. The RA preamble index (with a value corresponding to the selected CSI-RS) may then be provided to the lower layer entity (e.g., PHY entity) for the RA preamble transmission. In some implementations, the selected CSI-RS may have the strongest signal strength among the CSI-RSs associated with the selected BWP.

In some other implementations, in action 412, the UE may select at most N2 CSI-RSs (where N2 is a positive integer) having signal quality values larger than the second threshold value and being associated with the dedicated RA resources, and set the RA preamble index (e.g., the PREAMBLE_INDEX) for each selected CSI-RS.

If the outcome of action 410 is No, the procedure may proceed to node A, which continues with action 414 in FIG. 4B.

As shown in FIG. 4B, in action 414, the UE may determine whether the selected BWP associates with an SSB having a signal quality value (e.g., an SS-RSRP value) larger than the first threshold value (e.g., provided in the rsrp-ThresholdSSB IE) and being associated with a common RA resource (e.g., a CBRA resource).

If the outcome of action 414 is Yes, in action 416, the UE may select an SSB having the signal quality value larger than the first threshold value and being associated with the common RA resource, and set an RA preamble index to a value corresponding to the selected SSB. Then, the procedure may proceed to action 408, in which the UE may perform the RA transmission procedure based on the RA preamble index.

For example, if at least one SSB of the selected BWP (which is associated with the common RA resource) is available, and the at least one available SSB has an SS-RSRP value greater than the first threshold value (e.g., provided in the rsrp-ThresholdSSB IE), the UE may select an SSB from the at least one available SSB, and set an RA preamble index (e.g., the PREAMBLE_INDEX) to a value (e.g., ra-PreambleIndex) corresponding to the selected SSB. In some implementations, the selected SSB may have the strongest signal strength among the SSBs associated with the selected BWP.

In some other implementations, in action 416, the UE may select at most N3 SSBs (where N3 is a positive integer) having the signal quality values larger than the first threshold value and being associated with the common RA resources, and set the RA preamble index (e.g., the PREAMBLE_INDEX) for each selected SSB. In some implementations, the value of the PREAMBLE_INDEX (e.g., ra-PreambleIndex) may be randomly selected, with an equal probability, from a first set of candidate RA preambles associated with the selected SSB(s) and a second set of candidate RA preambles included in a selected RA preamble group (e.g., Preambles group A or Preambles group B).

In some implementations, the rsrp-ThresholdSSB IE and/or the rsrp-ThresholdCSI-RS IE may be configurable parameters by the network.

In some implementations, if the selected BWP is not configured with a common RA resource for a CBRA preamble selection, the MAC entity of the UE may switch to a default BWP or an initial BWP to perform the RA procedure. The default BWP or the initial BWP may be indicated by system information broadcast by a target cell, and/or by indicated by network signaling.

In some implementations, if the selected BWP is not configured with a common RA resource for a CBRA preamble selection, the RA resource selection may be considered failed and a new RA resource selection round may start. For example, the UE may perform action 402 again to reselect a new BWP for the RA procedure.

In some implementations, each BWP configured with the dedicated RA resource(s) may also be configured with common RA resource(s).

If the outcome of action 414 is No, in action 418, the UE may select an SSB that is associated with the selected BWP, and set an RA preamble index to a value corresponding to the selected SSB in action 418. For example, the MAC entity of the UE may select any SSB of the selected BWP, and set the RA preamble index (e.g., the PREAMBLE_INDEX) to a value (e.g., ra-PreambleIndex) corresponding to the selected SSB. In some implementations, among the SSBs with the SS-RSRP values lower than the rsrp-ThresholdSSB value, the selected SSB may have the strongest signal strength. Once the RA preamble index is determined at action 418, the procedure may go to action 408, in which an RA preamble transmission procedure may be performed based on the RA preamble index.

In some implementations, if the outcome of action 414 is No, the UE may select at most N4 SSBs (where N4 is a positive integer) associated with the selected BWP, and set the RA preamble index (e.g., the PREAMBLE_INDEX) for each corresponding selected SSB(s).

In some implementations, the values of N1, N2, N3, and N4 may be have the same value (e.g., N1=N2=N3=N4). In some implementations, at least one of the values of N1, N2, N3, and N4 may be different from the other values. The values of N1, N2, N3, and N4 may be predefined or configured by the network via dedicated signaling and/or broadcast system information.

As described above, in some implementations, the UE may select multiple SSBs/CSI-RSs during the SSB/CSI-RS selection. In such cases, the UE may transmit multiple RA preambles corresponding to the selected SSBs/CSI-RSs. For example, the UE may transmit an RA preamble on one or more BWPs at a time. For example, the UE may transmit multiple RA preambles before receiving an RAR. In some implementations, the MAC entity of the UE may prioritize to transmit multiple RA preambles on the dedicated RA resources over the common RA resources. In some implementations, the MAC entity of the UE may transmit the RA preambles on the dedicated RA resources and the common RA resources. For example, the UE may transmit an RA preamble on a dedicated RA resource, and transmit other RA preamble(s) on a common RA resource. In some implementations, the UE may transmit multiple RA preambles on the dedicated/common RA resources of different BWPs.

In some implementations, in action 408, when an SSB/CSI-RS is selected, the UE (or the MAC entity of the UE) may determine the next available PRACH occasion from the current PRACH occasion based on the RA configurations.

In some implementations, during the RA preamble transmission procedure, an RA preamble may be transmitted when the selected PRACH occasion passes the LBT procedure. In some implementations, multiple BWPs may be configured to a UE, and only one BWP configured with common/dedicated RA resources may be selected/indicated for synchronization. In such cases, an RA preamble may be transmitted only when a part of or the entire selected/indicated BWP passes the LBT procedure. In some implementations, the selected BWP may include multiple LBT units, and an RA preamble may be transmitted when at least parts of the LBT units pass the LBT procedure (even if not all of the LBT units in the selected/configured BWP pass the LBT procedure), where the RA resource (e.g., the PRACH occasion) is located in those parts of the LBT units.

In some implementations, when an RA preamble is successfully transmitted, the MAC entity of the UE may monitor the corresponding RAR in a Physical Downlink Control Channel (PDCCH) (or a control resource part, such as a Control Resource Set (CORESET)) of the selected BWP within an RAR window. For example, a first RA preamble may be transmitted on a BWP #1 when the selected RA resource for the first RA preamble passes an LBT procedure, and a second RA preamble may be transmitted on a BWP #2 when the selected RA resource for the second RA preamble passes an LBT procedure. In such cases, the MAC entity of the UE may monitor the corresponding RARs of the first and second RA preambles in the PDCCH of the BWP #1 and the PDCCH of the BWP #2, respectively. Each RAR window may start from the time when the corresponding RA preamble is successfully transmitted.

In some implementations, each transmitted RA preamble may correspond to an individual RAR window. The UE may determine whether an RAR of a transmitted RA preamble is successfully received by checking whether the RAR arrives at the UE within the RAR window.

In some implementations, multiple transmitted RA preambles may share a common RAR window. The UE may determine whether the corresponding RARs of the transmitted RA preambles are successfully received by checking whether the RARs arrive at the UE within the common RAR window. The common RAR window may start from the time when the first RA preamble is successfully transmitted.

In some implementations, for a BWP including multiple LBT units, each LBT unit may be configured with a PDCCH or a CORESET. When an RA preamble is successfully transmitted, the MAC entity of the UE may monitor an RAR in the PDCCH (or the CORESET) of an LBT unit (in which the selected PRACH occasion is located) within an RAR window. In some implementations, when an RA preamble is successfully transmitted, the MAC entity of the UE may monitor an RAR in a PDCCH of an LBT unit that passes the LBT procedure within an RAR window.

In some implementations, when multiple RA preambles are successfully transmitted on multiple BWPs, the UE may receive multiple corresponding RARs. The UE may select one of the BWPs (on which the RARs are received) as the First Activated BWP on a target cell during a handover procedure. In some implementations, the selected BWP may be the BWP on which an RAR is first received.

In some implementations, an RA procedure may be considered unsuccessful on a BWP when the value of the preamble transmission counter exceeds the maximum number of RA preamble transmission (e.g., PREAMBLE_TRANSMISSION_COUNTER=preambleTransMax+1), or when the number of LBT failure events exceeds a predefined or configured threshold. In such cases, the MAC entity of the UE may select another BWP for synchronization with the target cell. In some implementations, the MAC entity of the UE may indicate an RA problem to an upper layer entity (e.g., the RRC layer) when the RA procedure has failed. In response to the RA problem, the upper layer entity may initiate an RRC reestablishment procedure, or switch to another carrier/sub-band/BWP/channel for synchronizing with the target cell. In some other implementations, the MAC entity may not indicate an RA problem to the upper layer entity when the RA procedure has failed.

In some implementations, a timer (e.g., a T304 timer) may be activated when a UE receives an RRC reconfiguration message including a reconfiguration parameter for synchronization (e.g., the reconfigurationWithSync IE). The reconfiguration parameter may be used for a PCell change procedure and/or a PSCell addition procedure. In some implementations, when the T304 timer for an MCG expires, the UE may initiate an RRC reestablishment procedure based on the information of a BWP on an unlicensed spectrum that has failed the synchronization. In some implementations, if the T304 timer for an SCG expires, the UE may transmit SCG failure information to inform the network of a synchronization failure event. For example, the SCG failure information may include a failure type (e.g., the scg-ChangeFailure IE) as well as the information of a BWP on an unlicensed spectrum that has failed the synchronization.

In some implementations, for each round of RA resource selection, a UE may perform a reselection procedure (e.g., the reselection procedure as illustrated in FIG. 3) to select a new BWP for the RA procedure. For example, when an RA preamble is unsuccessfully transmitted on the selected BWP in action 408, the UE may start a new round of RA resource selection and go back to action 402 to select another BWP for the RA preamble transmission procedure. In some implementations, the new BWP may be selected from a set of BWPs associated with the dedicated RA resources. In some implementations, the new BWP may be selected from a set of BWPs associated with the dedicated and/or common RA resources.

In some implementations, a UE may consider all BWPs associated with the dedicated RA resources simultaneously when performing the RA resource selection. In such cases, the UE may not need to select a BWP before performing an SSB/CSI-RS selection, and the selected RA resource may be picked from any BWP configured with the dedicated RA resources, as illustrated in FIGS. 5A and 5B.

Figure 5A:
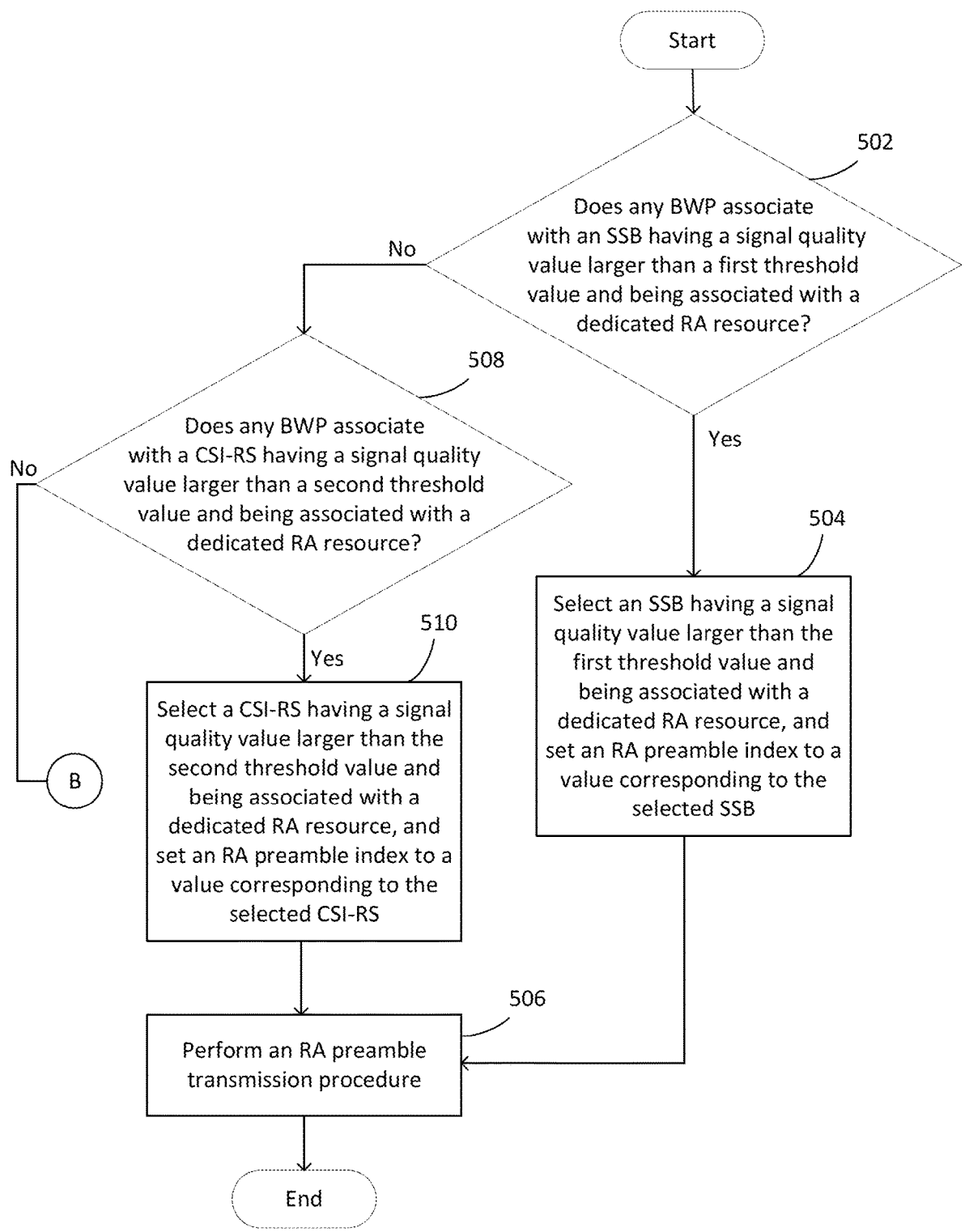
FIGS. 5A and 5B are flowcharts for a method of performing an RA procedure, in accordance with an example implementation of the present application.
Figure 5B:
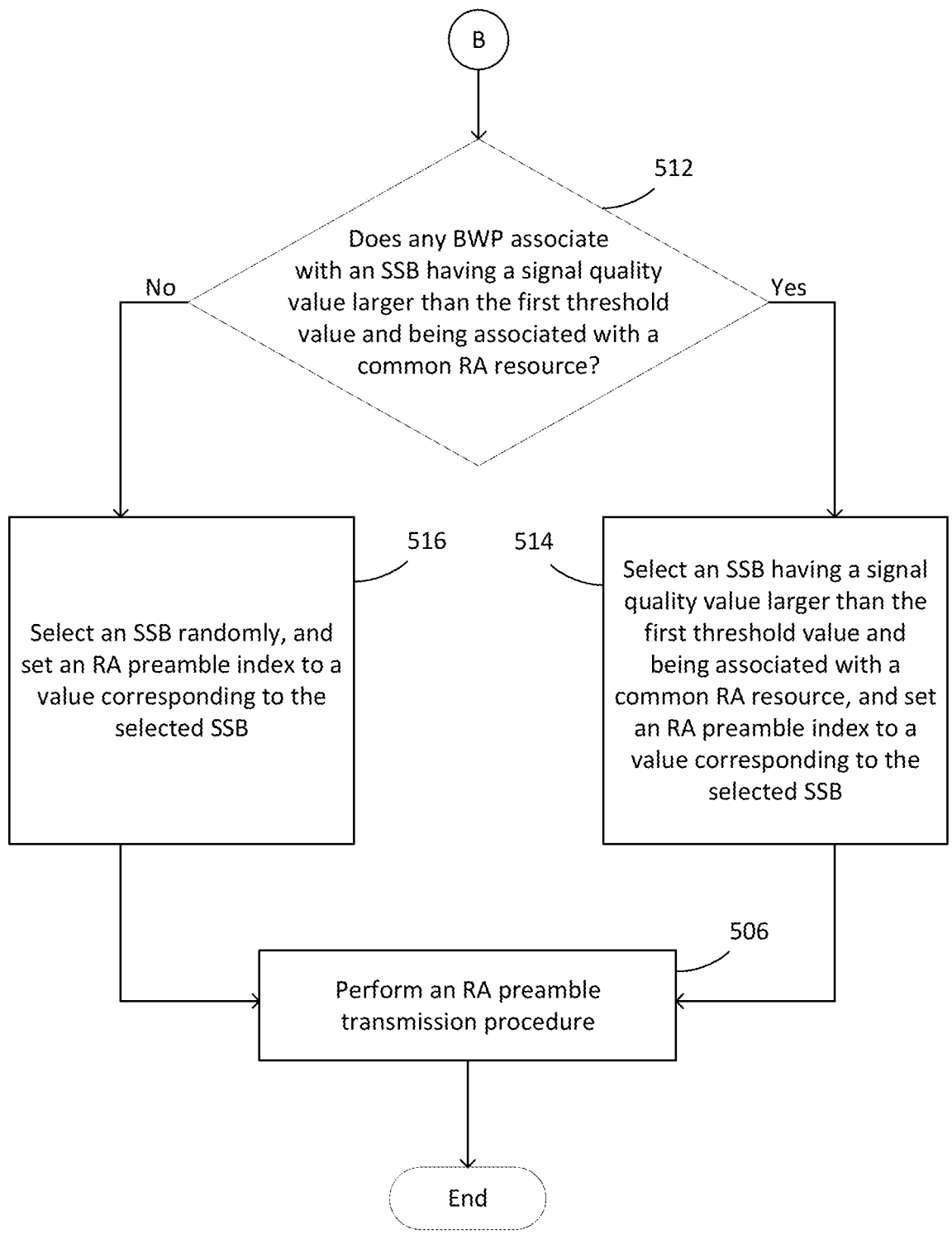

FIGS. 5A and 5B illustrate a flowchart for a method of performing an RA procedure, in accordance with an example implementation of the present application.

In FIG. 5A, in action 502, a UE may determine whether there is any BWP associated with an SSB having a signal quality value (e.g., an SS-RSRP value) larger than a first threshold value (e.g., provided in the rsrp-ThresholdSSB IE) and being associated with a dedicated RA resource.

If the outcome of action 502 is Yes, in action 504, the UE may select an SSB having a signal quality value larger than the first threshold value and being associated with a dedicated RA resource, and set an RA preamble index (e.g., the PREAMBLE_INDEX) to a value (e.g., ra-PreambleIndex) corresponding to the selected SSB.

For example, the dedicated RA resources associated with the SSBs of a set of BWPs may be explicitly provided by the RRC entity of the UE. Among the associated SSBs, there may be at least one available SSB having an SS-RSRP value greater than the rsrp-ThresholdSSB value (i.e., the value of the rsrp-ThresholdSSB IE). In such cases, the MAC entity of the UE may select one of the at least one available SSB and set the PREAMBLE_INDEX to a value (e.g., ra-PreambleIndex) corresponding to the selected SSB. In some implementations, the selected SSB may be determined based on specific UE implementations. In some implementations, the selected SSB may be associated with a BWP with the highest priority value among the set of BWPs. The priority value of the BWP may be configured via the dedicated signaling or system information broadcast by the network. In some implementations, the selected SSB may be an SSB associated with a BWP with the lowest channel occupancy rate (or with a channel occupancy rate less than a predetermined or configured threshold value). In some implementations, the selected SSB may have the strongest signal strength among the available SSBs.

In some other implementations, in action 504, the UE may select at most N5 SSBs (where N5 is a positive integer) having signal quality values larger than the first threshold value and being associated with the dedicated RA resources, and set the RA preamble index (e.g., the PREAMBLE_INDEX) for each corresponding selected SSB(s).

In action 506, the UE may perform an RA preamble transmission procedure. For example, the UE may instruct the PHY layer to transmit an RA preamble through a PRACH occasion which is corresponding to the RA-RNTI (if available), the RA preamble index (e.g., the PREAMBLE_INDEX), and the preamble received target power (e.g., the PREAMBLE_RECEIVED_TARGET_POWER).

If the outcome of action 502 is No, in action 508, the UE may determine whether there is any BWP associated with a CSI-RS having a signal quality value (e.g., a CSI-RSRP value) larger than a second threshold value (e.g., provided in the rsrp-ThresholdCSI-RS IE) and being associated with a dedicated RA resource.

If the outcome of action 508 is Yes, in action 510, the UE may select a CSI-RS having a signal quality value larger than the second threshold value and being associated with a dedicated RA resource, and set an RA preamble index (e.g., the PREAMBLE_INDEX) to a value (e.g., ra-PreambleIndex) corresponding to the selected CSI-RS. When the RA preamble index is determined, the procedure may proceed to action 506, in which the UE may perform an RA preamble transmission procedure based on the RA preamble index.

For example, if the dedicated RA resources associated with the CSI-RSs of a set of BWPs have been explicitly provided by the RRC entity, and among the associated CSI-RSs, there is at least one available CSI-RS with a CSI-RSRP value greater than the second threshold value (e.g., provided in the rsrp-ThresholdCSI-RS IE), the MAC entity of the UE may select one of the at least one available CSI-RS and set the PREAMBLE_INDEX to a value (e.g., ra-PreambleIndex) corresponding to the selected CSI-RS. In some implementations, the selected CSI-RS may be determined based on specific UE implementations. In some implementations, the selected CSI-RS may be associated with a BWP with the highest priority value among the set of BWPs.

In some other implementations, in action 510, the UE may select at most N6 CSI-RSs (where N6 is a positive integer) having signal quality values larger than the second threshold value and being associated with dedicated RA resources. The UE may further set the RA preamble index (e.g., the PREAMBLE_INDEX) for each corresponding selected CSI-RS(s) in action 510.

If the outcome of action 508 is No, the procedure may proceed to node B, which continues with action 512 in FIG. 5B.

In action 512, the UE may determine whether there is any BWP associated with an SSB having a signal quality value larger than the first threshold value and being associated with a common RA resource.

If the outcome of action 512 is Yes, in action 514, the UE may select an SSB having a signal quality value (e.g., an SS-RSRP value) larger than the first threshold value (e.g., provided in the rsrp-ThresholdSSB IE) and being associated with a common RA resource (e.g., a CBRA resource). The UE may further set an RA preamble index to a value corresponding to the selected SSB in action 514. The procedure may then proceed to action 506, in which the UE may perform the RA transmission procedure based on the RA preamble index.

For example, if at least one SSB associated with BWPs configured with dedicated RA resources is available, and the at least one available SSB has an SS-RSRP value greater than the rsrp-ThresholdSSB value, the UE may select one of the at least one available SSB, and set an RA preamble index (e.g., the PREAMBLE_INDEX) to a value (e.g., ra-PreambleIndex) corresponding to the selected SSB. In some implementations, the selected SSB may be determined based on specific UE implementations. In some implementations, the selected SSB may be associated with a BWP with the highest priority value among the BWPs configured with dedicated RA resources. In some implementations, the selected SSB may be associated with a BWP with the lowest channel occupancy rate (or with a channel occupancy rate less than a predefined or configured threshold value). In some implementations, the selected SSB may have the strongest signal strength among the available SSBs.

Each BWP configured to a UE may be configured with a common RA resource and/or a dedicated RA resource. In some implementations, if the BWPs configured to the UE are configured only with common RA resources and without dedicated RA resources, the MAC entity of the UE may switch to a default BWP or an initial BWP for a CBRA preamble selection, or start a new round of RA resource selection. The default BWP and the initial BWP may be indicated by system information and/or network signaling.

In some other implementations, in action 514, the UE may select at most N7 SSBs (where N7 is a positive integer) having signal quality values larger than the first threshold value and being associated with the common RA resources, and set the RA preamble index (e.g., the PREAMBLE_INDEX) for each corresponding selected SSB(s).

If the outcome of action 512 is No, in action 516, the UE may randomly select an SSB and set an RA preamble index to a value corresponding to the selected SSB. Then, the procedure may proceed to action 506, in which an RA preamble transmission procedure may be performed based on the RA preamble index.

For example, the MAC entity of the UE may select an SSB associated with a set of BWPs configured to the UE, and set the RA preamble index (e.g., the PREAMBLE_INDEX) to a value corresponding to the selected SSB. In some implementations, the selected SSB may be determined based on specific UE implementations. In some implementations, the selected SSB may be associated with a BWP with the highest priority value among the set of BWPs. In some implementations, the selected SSB may be an SSB associated with a BWP with the lowest channel occupancy rate. In some implementations, the selected SSB may have the strongest signal strength.

In some other implementations, in action 516, the UE may select at most N8 SSBs (where N8 is a positive integer) associated with the set of BWPs configured to the UE, and set an RA preamble index (e.g., the PREAMBLE_INDEX) for each corresponding selected SSB.

In some implementations, the values of N5, N6, N7, and N8 may be have the same value (e.g., N5=N6=N7=N8). In some implementations, at least one of the values of N5, N6, N7, and N8 may be different than the other values. The values of N5, N6, N7, and N8 may be predefined or configured by the network via dedicated signaling and/or system information.

In some implementations, in action 506, when an SSB/CSI-RS is selected (e.g., selected in action 504, 508, 514 or 516), the UE (or the MAC entity of the UE) may derive the next available PRACH occasion from the (current) PRACH occasions based on the RA configurations associated with the set of BWPs configured to the UE.

Figure 6:
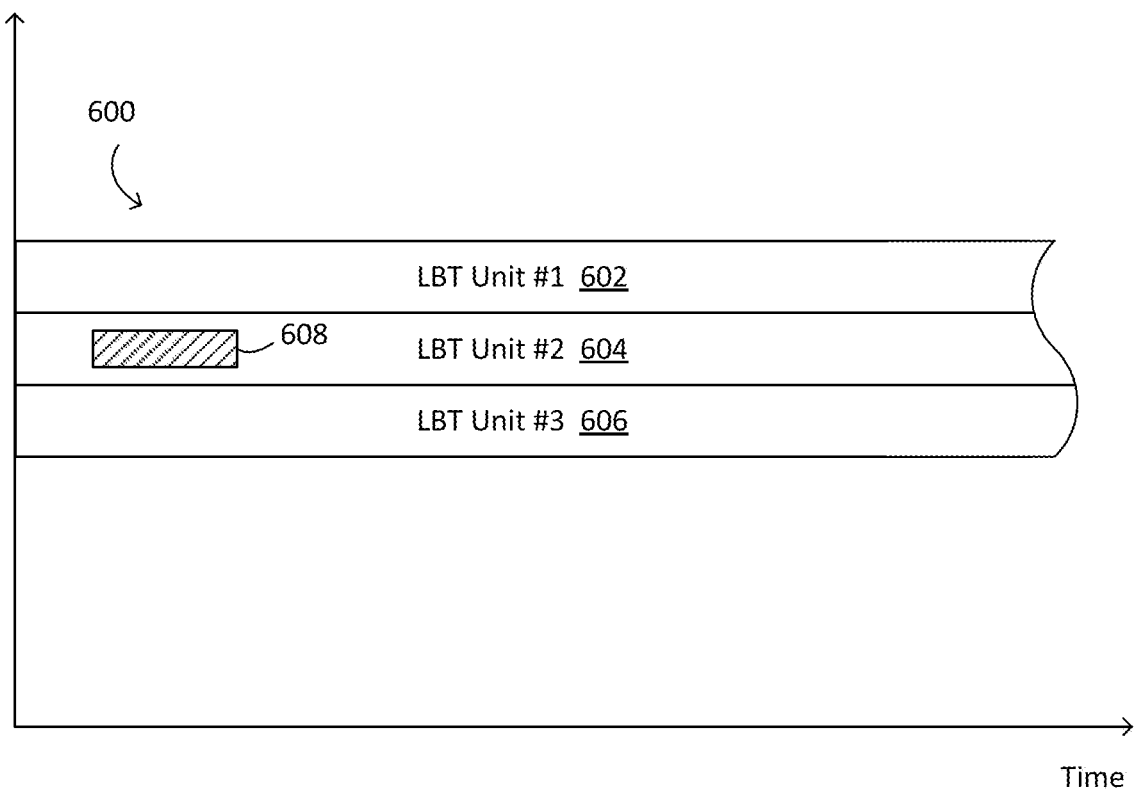
FIG. 6 is a schematic diagram illustrating a BWP including multiple Listen Before Talk (LBT) units, in accordance with an example implementation of the present application.

FIG. 6 is a schematic diagram illustrating a BWP including multiple LBT units, in accordance with an example implementation of the present application. As shown in FIG. 6, BWP 600 includes LBT unit #1 602, LBT unit #2 604, and LBT unit #3 606, where LBT unit #2 604 includes an RA resource 608 (a common/dedicated RA resource). It should be noted that even though three LBT units are included in the example implementation illustrated in FIG. 6, any number of LBT units may be included in a BWP in other implementations of the present application.

In some implementations, only when the entire BWP 600 passes the LBT procedure, an RA preamble may be transmitted on RA resource 608. In other words, the RA preamble may be transmitted when LBT unit #1 602, LBT unit #2 604 and LBT unit #3 606 all pass the LBT procedure.

In some other implementations, as long as a part of BWP 600 passes the LBT procedure, an RA preamble may be transmitted on RA resource 608. For example, the RA preamble may be transmitted when LBT unit #2 604 (in which RA resource 608 locates) has passed the LBT procedure but other LBT units (e.g., LBT unit #1 602 and LBT unit #3 606) have not.

In some implementations, the bandwidth of an LBT unit may be fixed to 20 MHz. In some implementations, the bandwidth of an LBT unit may be configured based on a per serving cell basis, a per UE basis, or a per BWP basis. For example (e.g., for the UE-based configuration case), the bandwidth of an LBT unit for a UE may be provided by the network via dedicated signaling or system information (e.g., broadcast by a target cell). In another example (for the BWP-based configuration case), the bandwidth of an LBT unit for a BWP may be provided by the network via dedicated signaling or system information (e.g., broadcast by a target cell).

In some implementations, an RA configuration (e.g., a dedicated RACH configuration) may be configured based on a per LBT unit basis. For example, for a BWP including multiple LBT units, each LBT unit may be configured with an LBT unit ID and associated with a dedicated RACH configuration. For example, the dedicated RACH configuration may be a RACH-ConfigDedicated IE that includes one or more dedicated RA parameters.

In some implementations, a UE may be provided with a cell group configuration (e.g., the CellGroupConfig IE) including a first reconfiguration parameter (e.g., the ReconfigurationWithSync IE) for licensed spectrums and a second reconfiguration parameter (e.g., the ReconfigurationWithSyncNRU IE) for unlicensed spectrums. The first and second reconfiguration parameters may be used in, for example, a PCell change procedure and/or a PSCell addition procedure.

In some implementations, each LBT unit may be associated with a common RACH configuration. In some implementations, each LBT unit may be associated with a generic RACH configuration (e.g., the RACH-ConfigGeneric IE).

An example cell group configuration is shown in Table 1. The example cell group configuration may support a dedicated RACH configuration that is configured based on a per LBT unit basis.

TABLE 1

```
-- ASN1START
-- TAG-CELL-GROUP-CONFIG-START
-- Configuration of one Cell-Group:
CellGroupConfig ::=            SEQUENCE {
```

TABLE 1-continued

```
  cellGroupId                         ,
  rlc-BearerToAddModList                      SEQUENCE (SIZE(1..maxLC-ID)) OF RLC-
BearerConfig     OPTIONAL, -- Need N
  rlc-BearerToReleaseList                     SEQUENCE (SIZE(1..maxLC-ID)) OF
LogicalChannelIdentity         OPTIONAL, -- Need N
  mac-CellGroupConfig                         OPTIONAL, -- Need M
  physicalCellGroupConfig                     OPTIONAL, -- Need M
  spCellConfig                                OPTIONAL, -- Need M
  sCellToAddModList                  SEQUENCE (SIZE (1..maxNrofSCells)) OF SCellConfig
OPTIONAL, -- Need N
  sCellToReleaseList                 SEQUENCE (SIZE (1..maxNrofSCells)) OF SCellIndex
OPTIONAL, -- Need N
  ...,
  [[
  reportUplinkTxDirectCurrent-v1530           ENUMERATED   {true}
OPTIONAL -- Cond BWP-Reconfig
  ]]
}
-- Serving cell specific MAC and PHY parameters for a SpCell:
SpCellConfig ::=           SEQUENCE {
  servCellIndex                               OPTIONAL, -- Cond SCG
  reconfigurationWithSync                     OPTIONAL, -- Cond
ReconfWithSync
  rlf-TimersAndConstants             SetupRelease { RLF-TimersAndConstants }
OPTIONAL, -- Need M
  rlmInSyncOutOfSyncThreshold                 ENUMERATED {n1}
OPTIONAL, -- Need S
  spCellConfigDedicated      ServingCellConfig        OPTIONAL,
-- Need M
  ...
}
ReconfigurationWithSync ::=        SEQUENCE {
  spCellConfigCommon                          ServingCellConfigCommon
OPTIONAL, -- Need M
  newUE-Identity             RNTI-Value,
  t304                       ENUMERATED {ms50, ms100, ms150, ms200, ms500, ms1000,
ms2000, ms10000},
  rach-ConfigDedicated       CHOICE {
    uplink                   RACH-ConfigDedicated,
    supplementaryUplink           RACH-ConfigDedicated
  }                                           OPTIONAL, -- Need N
  ...,
  [[
  smtc                     SSB-MTC            OPTIONAL --
Need S
  ]]
}
ReconfigurationWithSyncNRU ::=     SEQUENCE {
  spCellConfigCommon                          ServingCellConfigCommon
OPTIONAL, -- Need M
  newUE-Identity             RNTI-Value,
  t304                       ENUMERATED {ms50, ms100, ms150, ms200, ms500, ms1000,
ms2000, ms10000},
  rach-ConfigDedicated       CHOICE {
    uplink                   SEQUENCE (SIZE(1..maxLBTUnit)) OF RACH-ConfigDedicated,
    supplementaryUplink           SEQUENCE (SIZE(1..maxLBTUnit)) OF RACH-
ConfigDedicated
  }                                           OPTIONAL, -- Need N
  ...,
  [[
  smtc                     SSB-MTC            OPTIONAL --
Need S
  ]]
}
SCellConfig ::=            SEQUENCE {
  sCellIndex                 SCellIndex,
  sCellConfigCommon                           ServingCellConfigCommon
OPTIONAL, -- Cond SCellAdd
  sCellConfigDedicated       ServingCellConfig        OPTIONAL,
-- Cond SCellAddMod
  ...,
  [[
  smtc                     SSB-MTC            OPTIONAL --
Need S
  ]]
}
-- TAG-CELL-GROUP-CONFIG-STOP
-- ASN1STOP
```

In some implementations, the dedicated RACH configuration (e.g., the RACH-ConfigDedicated IE) may include dedicated RA parameters for each LBT unit on unlicensed spectrums. For example, the maxLBTUnit IE may be used to indicate the maximum number of LBT units in a BWP, which may be a configurable or predefined parameter. An example RACH-ConfigDedicated IE may be as shown in Table 2, where the LBTUnitID IE may be used to identify an LBT Unit ID for an LBT unit in a BWP. In some implementations, the LBT Unit ID may be an integer.

TABLE 2

```
-- ASN1START
-- TAG-RACH-CONFIG-DEDICATED-START
RACH-ConfigDedicated ::=        SEQUENCE {
    cfra                CFRA                            OPTIONAL, -- Need S
    ra-Prioritization                                   OPTIONAL, -- Need N
    lbtunitID           LBTUnitID       OPTIONAL,
    ...
}
CFRA ::=                SEQUENCE {
    occasions           SEQUENCE {
        rach-ConfigGeneric          RACH-ConfigGeneric,
        ssb-perRACH-Occasion        ENUMERATED {oneEighth, oneFourth, oneHalf, one, two, four, eight, sixteen} OPTIONAL -- Cond SSB-CFRA
    }                                                   OPTIONAL, -- Need S
    resources           CHOICE {
        ssb             SEQUENCE {
            ssb-ResourceList            SEQUENCE (SIZE(1..maxRA-SSB-Resources)) OF CFRA-SSB-Resource,
            ra-ssb-OccasionMaskIndex    INTEGER (0..15)
        },
        csirs           SEQUENCE {
            csirs-ResourceList          SEQUENCE (SIZE(1..maxRA-CSIRS-Resources)) OF CFRA-CSIRS-Resource,
            rsrp-ThresholdCSI-RS        RSRP-Range
        }
    },
    ...,
    [[
    totalNumberOfRA-Preambles-v1530 INTEGER (1..63)     OPTIONAL -- Cond Occasions
    ]]
}
CFRA-SSB-Resource ::=           SEQUENCE {
    ssb                 SSB-Index,
    ra-PreambleIndex    INTEGER (0..63),
    ...
}
CFRA-CSIRS-Resource ::=         SEQUENCE {
    csi-RS              CSI-RS-Index,
    ra-OccasionList     SEQUENCE (SIZE(1..maxRA-OccasionsPerCSIRS))
                        OF INTEGER (0..maxRA-Occasions-1),
    ra-PreambleIndex    INTEGER (0..63),
    ...
}
-- TAG-RACH-CONFIG-DEDICATED-STOP
-- ASN1STOP
```

In some implementations, the BWP-Uplink IE may be used to configure an uplink BWP with multiple LBT units, as shown in Table 3. In addition, the corresponding UL frequency information may be configured for each LBT unit in the configurations.

TABLE 3

```
-- ASN1START
-- TAG-BWP-UPLINK-START
BWP-Uplink ::=          SEQUENCE {
    bwp-Id              BWP-Id,
    LBTUnitToAddModList     SEQUENCE (SIZE(1..maxLBTUnit)) of LBTUnitID
    LBTUnitReleaseList      SEQUENCE (SIZE(1..maxLBTUnit)) of LBTUnitID
    bwp-Common          BWP-UplinkCommon        OPTIONAL,
    -- Cond SetupOtherBWP
    bwp-Dedicated       BWP-UplinkDedicated     OPTIONAL,
```

TABLE 3-continued

```
-- Need M
    ...
}
-- TAG-BWP-UPLINK-STOP
-- ASN1STOP
```

In some implementations, if an RA resource (e.g., a PRACH resource) spans multiple LBT units in the frequency domain, the RA resource may be available for an RA preamble transmission only when all of the associated LBT units (in which the RA resource locates) pass the LBT procedure.

Figure 7:
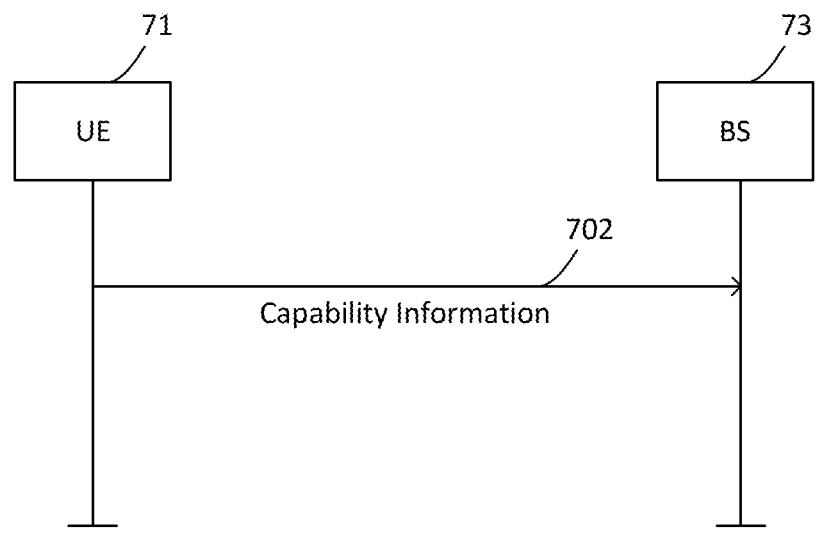
FIG. 7 is a schematic diagram illustrating a message flow between a User Equipment (UE) and a Base Station (BS), in accordance with an example implementation of the present application.

FIG. 7 is a schematic diagram illustrating a message flow between a UE and a BS, in accordance with an example implementation of the present application.

In action 702, UE 71 (or an apparatus of wireless communications) may transmit capability information (e.g., a UE capability message/IE) to BS 73.

In some implementations, UE 71 may transmit the capability information to BS 73 to indicate whether UE 71 supports performing an RA procedure using multiple BWPs in a set of BWPs configured to UE 71.

In some implementations, UE 71 may transmit the capability information to BS 73 to indicate whether UE 71 supports performing an LBT procedure on multiple LBT units.

In some implementations, UE 71 may transmit the capability information to BS 73 to indicate whether UE 71 is capable of being configured with common and/or dedicated RA resources on multiple BWPs for synchronization (e.g., to handover to an NR-U target cell, or to add an NR-U PSCell), and/or whether UE 71 is capable of performing a BWP selection for an RA procedure.

In some implementations, UE 71 may transmit the capability information to BS 73 to indicate whether UE 71 is capable of being configured with common and/or dedicated RA resources on multiple BWPs for synchronization (e.g., to handover to an NR-U target cell, or to add an NR-U PSCell), and/or whether UE 71 is capable of performing a BWP selection for each round of RA resource selection.

In some implementations, UE 71 may transmit the capability information to BS 73 to indicate to BS 73 the size of an LBT unit that UE 71 supports. For example, the capability information may include an LBT-related parameter (e.g., an LBTUnitSize IE) indicating the LBT unit size. An example data structure of the LBTUnitSize IE may be illustrated in Table 3:

TABLE 3

| LBTUnitSize | ENUMERATED {20, 40, 60, 80} |
|---|---|

According to Table 3, the LBTUnitSize IE indicates that the LBT unit size may be 20 MHz, 40 MHz, 60 MHz or 80 MHz.

In some implementations, UE 71 may transmit the capability information to BS 73 to indicate whether UE 71 is capable of transmitting multiple RA preambles on multiple BWPs configured with dedicated/common RA resources.

In some implementations, UE 71 may transmit the capability information to BS 73 to indicate whether UE 71 is capable of transmitting multiple RA preambles on multiple BWPs.

In some implementations, based on the system information broadcast by the network and/or the dedicated signaling, a UE may know whether selecting dedicated RA resources (e.g., dedicated PRACH resources) from multiple configured BWPs is allowed, or may determine whether to select dedicated RA resources from multiple configured BWPs. The dedicated RA resources may be used in a PCell change procedure and/or a PSCell addition procedure.

In some implementations, based on the system information broadcast by the network and/or the dedicated signaling, a UE may know that whether the UE is allowed to perform an RA preamble transmission on a BWP when only a part of the BWP passes the LBT procedure (e.g., only an LBT unit, in which the RA resource locates, in the BWP pass the LBT procedure).

In some implementations, a handover message may not include any BWP-related configuration. For example, the first active UL BWP (or the initial BWP) may not present in (or be indicated by) the reconfiguration parameter for synchronization (e.g., the ReconfigurationWithSync IE). In some implementations, the configuration for the dedicated/common RA resources may be independent of the BWP-related configurations. In some implementations, a UE may be configured with time and frequency locations of a dedicated/common RA resource.

Figure 8:
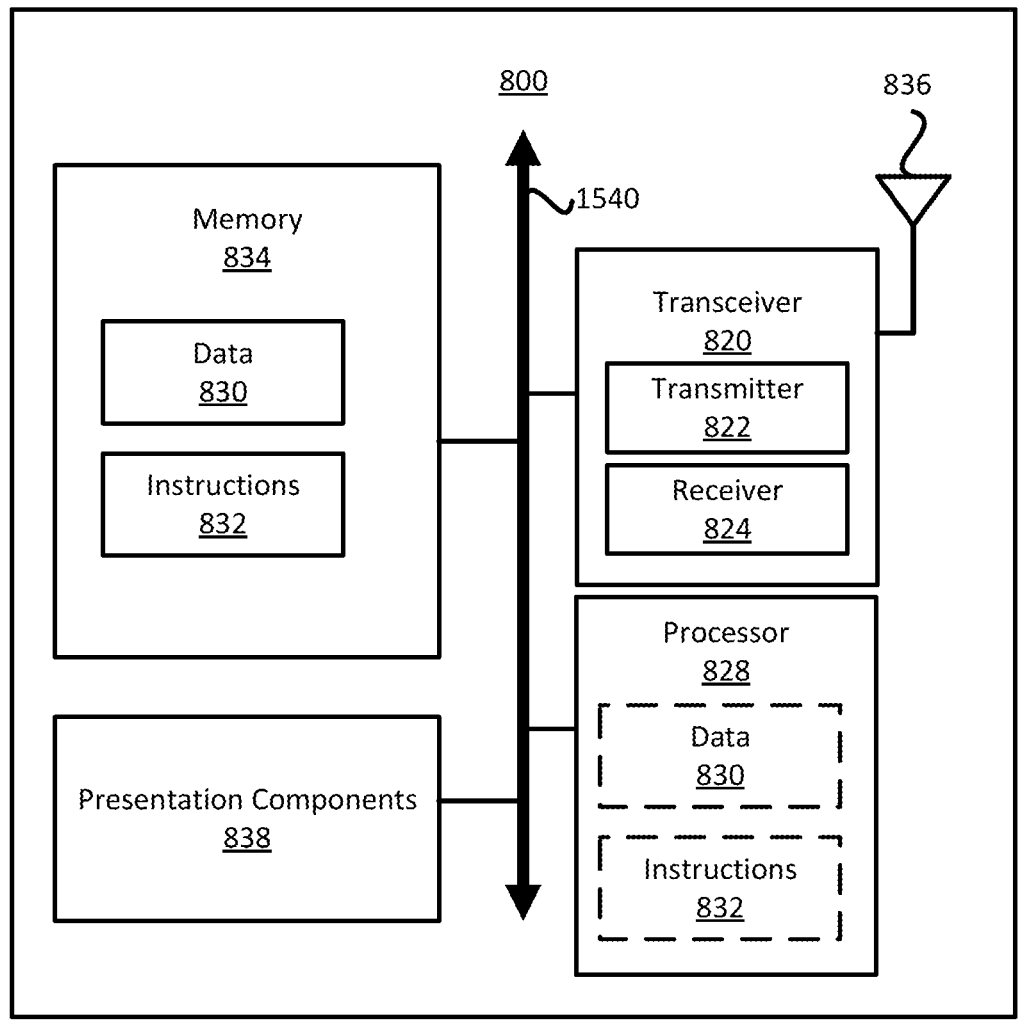
FIG. 8 is a block diagram illustrating an apparatus for wireless communications, in accordance with various aspects of the present application.

FIG. 8 is a block diagram illustrating an apparatus for wireless communications, in accordance with various aspects of the present application. As shown in FIG. 8, apparatus 800 may include transceiver 820, processor 828, memory 834, one or more presentation components 838, and at least one antenna 836. Apparatus 800 may also include an RF spectrum band module, a base station communications module, a network communications module, and a system communications management module, Input/Output (I/O) ports, I/O components, and power supply (not explicitly shown in FIG. 8). Each of these components may be in communication with each other, directly or indirectly, over one or more buses 840. In one implementation, apparatus 800 may be a UE or a base station that performs various functions described herein, for example, with reference to FIGS. 1 through 7.

Transceiver 820 having transmitter 822 (e.g., transmitting/transmission circuitry) and receiver 824 (e.g., receiving/reception circuitry) may be configured to transmit and/or receive time and/or frequency resource partitioning information. In some implementations, the transceiver 820 may be configured to transmit in different types of subframes and slots including, but not limited to, usable, non-usable and flexibly usable subframes and slot formats. The transceiver 820 may be configured to receive data and control channels.

Apparatus 800 may include a variety of computer-readable media. Computer-readable media may be any available media that may be accessed by apparatus 800 and include both volatile and non-volatile media, removable and non-removable media. By way of example, and not limitation, computer-readable media may comprise computer storage media and communication media. Computer storage media may include both volatile and non-volatile, removable and non-removable media implemented in any method or technology for storage of information such as computer-readable instructions, data structures, program modules or data.

Computer storage media may include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not comprise a propagated data signal. Communication media may typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

Memory 834 may include computer-storage media in the form of volatile and/or non-volatile memory. Memory 834 may be removable, non-removable, or a combination thereof. Example memory includes solid-state memory, hard drives, optical-disc drives, etc. As illustrated in FIG. 8, memory 834 may store computer-readable, computer-executable instructions 832 (e.g., software codes) that are configured to, when executed, cause processor 828 to perform various functions described herein, for example, with reference to FIGS. 1 through 7. Alternatively, instructions 832 may not be directly executable by processor 828 but be configured to cause apparatus 800 (e.g., when compiled and executed) to perform various functions described herein.

Processor 828 (e.g., having processing circuitry) may include an intelligent hardware device, e.g., a Central Processing Unit (CPU), a microcontroller, an ASIC, etc. Processor 828 may include memory. Processor 828 may process data 830 and instructions 832 received from memory 834, and information through transceiver 820, the base band communications module, and/or the network communications module. Processor 828 may also process information to be sent to transceiver 820 for transmission through antenna 836, to the network communications module for transmission to a core network.

One or more presentation components 838 presents data indications to a person or other device. Examples of presentation components 838 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. An apparatus for wireless communications, comprising:
    a memory; and
    at least one processor coupled to the memory, the at least one processor being configured to:
        receive a plurality of Random Access (RA) configurations associated with a set of Bandwidth Parts (BWPs);
        select a first BWP from the set of BWPs to perform an RA procedure;
        select a first Synchronization Signal Block (SSB) associated with the first BWP, the first SSB being configured with a first RA resource;
        transmit a first RA preamble using the first RA resource; and
        set the first BWP as a first-activated BWP when the RA procedure is successfully performed, wherein:
        the first RA resource is contained in a dedicated Listen Before Talk (LBT) unit in the first BWP,
        the dedicated LBT unit occupies a part of resources of the first BWP, and
        the first RA preamble is transmitted when an LBT procedure performed on the dedicated LBT unit is successful.

2. The apparatus of claim 1, wherein the at least one processor is further configured to:
    perform a reselection procedure during the RA procedure, the reselection procedure including:
        selecting a second BWP from the set of BWPs;
        switching to the second BWP to continue the RA procedure;
        selecting a second SSB associated with the second BWP, the second SSB being configured with a second RA resource; and
        transmitting a second RA preamble using the second RA resource.

3. The apparatus of claim 2, wherein the second SSB is selected when the second BWP has a lowest channel occupancy rate among the set of BWPs.

4. The apparatus of claim 2, wherein the second SSB is selected when the second SSB has a strongest signal strength level compared to other SSBs.

5. The apparatus of claim 2, wherein the second BWP is selected when the second BWP has a highest priority value among the set of BWPs.

6. The apparatus of claim 1, wherein the first BWP is selected from the set of BWPs based on at least one of a channel occupancy condition and whether a contention-free RA resource is configured.

7. The apparatus of claim 1, wherein each of the plurality of RA configurations is configured based on a per LBT unit basis.

8. The apparatus of claim 1, wherein the at least one processor is further configured to:
    transmit capability information to a base station to indicate whether the apparatus supports performing the RA procedure using more than one BWP in the set of BWPs.

9. The apparatus of claim 1, wherein the at least one processor is further configured to:
    transmit capability information to a base station to indicate whether the apparatus supports performing an LBT procedure on more than one LBT unit.

10. A method performed by an apparatus of wireless communications, the method comprising:
    receiving a plurality of Random Access (RA) configurations associated with a set of Bandwidth Parts (BWPs);
    selecting a first BWP from the set of BWPs to perform an RA procedure;
    selecting a first Synchronization Signal Block (SSB) associated with the first BWP, the first SSB being configured with a first RA resource;
    transmitting a first RA preamble using the first RA resource; and
    setting the first BWP as a first-activated BWP when the RA procedure is successfully performed, wherein:

the first RA resource is contained in a dedicated Listen Before Talk (LBT) unit in the first BWP, the dedicated LBT unit occupies a part of resources of the first BWP, and the first RA preamble is transmitted when an LBT procedure performed on the dedicated LBT unit is successful.

11. The method of claim 10, further comprising:
performing a reselection procedure during the RA procedure, the reselection procedure including:
selecting a second BWP from the set of BWPs;
switching to the second BWP to continue the RA procedure;
selecting a second SSB associated with the second BWP, the second SSB being configured with a second RA resource; and
transmitting a second RA preamble using the second RA resource.

12. The method of claim 11, wherein the second SSB is selected when the second BWP has a lowest channel occupancy rate among the set of BWPs.

13. The method of claim 11, wherein the second SSB is selected when the second SSB has a strongest signal strength level compared to other SSBs.

14. The method of claim 11, wherein the second BWP is selected when the second BWP has a highest priority value among the set of BWPs.

15. The method of claim 10, wherein the first BWP is selected from the set of BWPs based on at least one of a channel occupancy condition and whether a contention-free RA resource is configured.

16. The method of claim 10, wherein each of the plurality of RA configurations is configured based on a per LBT unit basis.

17. The method of claim 10, further comprising:
transmitting capability information to a base station to indicate whether the apparatus supports performing the RA procedure using more than one BWP in the set of BWPs.

18. The method of claim 10, further comprising: transmitting capability information to a base station to indicate whether the apparatus supports performing an LBT procedure on more than one LBT unit.

* * * * *